United States Patent [19]
Kozlow

[11] 3,942,812
[45] Mar. 9, 1976

[54] SNOWMOBILE SKI

[76] Inventor: Woodruff J. Kozlow, 491 Somerset, Standish, Mich. 48658

[22] Filed: Dec. 6, 1973

[21] Appl. No.: 422,428

Related U.S. Application Data

[63] Continuation of Ser. No. 253,863, May 16, 1972, Pat. No. 3,778,078.

[52] U.S. Cl. .............................................. 280/28
[51] Int. Cl.² ........................................ B62B 17/02
[58] Field of Search ........ 280/28, 12 R, 16; 180/5 R

[56] References Cited
UNITED STATES PATENTS

3,732,939  5/1973  Samson ................................. 280/28
3,739,458  6/1973  Reedy .................................. 280/28

*Primary Examiner*—Robert R. Song
*Attorney, Agent, or Firm*—John J. Swartz

[57] ABSTRACT

A snowmobile ski comprising a longitudinal runner and a keel, mounted on the underside of the runner, including a wear bar engageable with a surface to be traversed, a pair of clamps removably connected to the underside of the runner for releasably clamping opposite sides of the wear bar, and longitudinal key members locking the wear bar to the clamps to selectively prevent relative vertical movement of the wear bar and the clamps.

15 Claims, 6 Drawing Figures

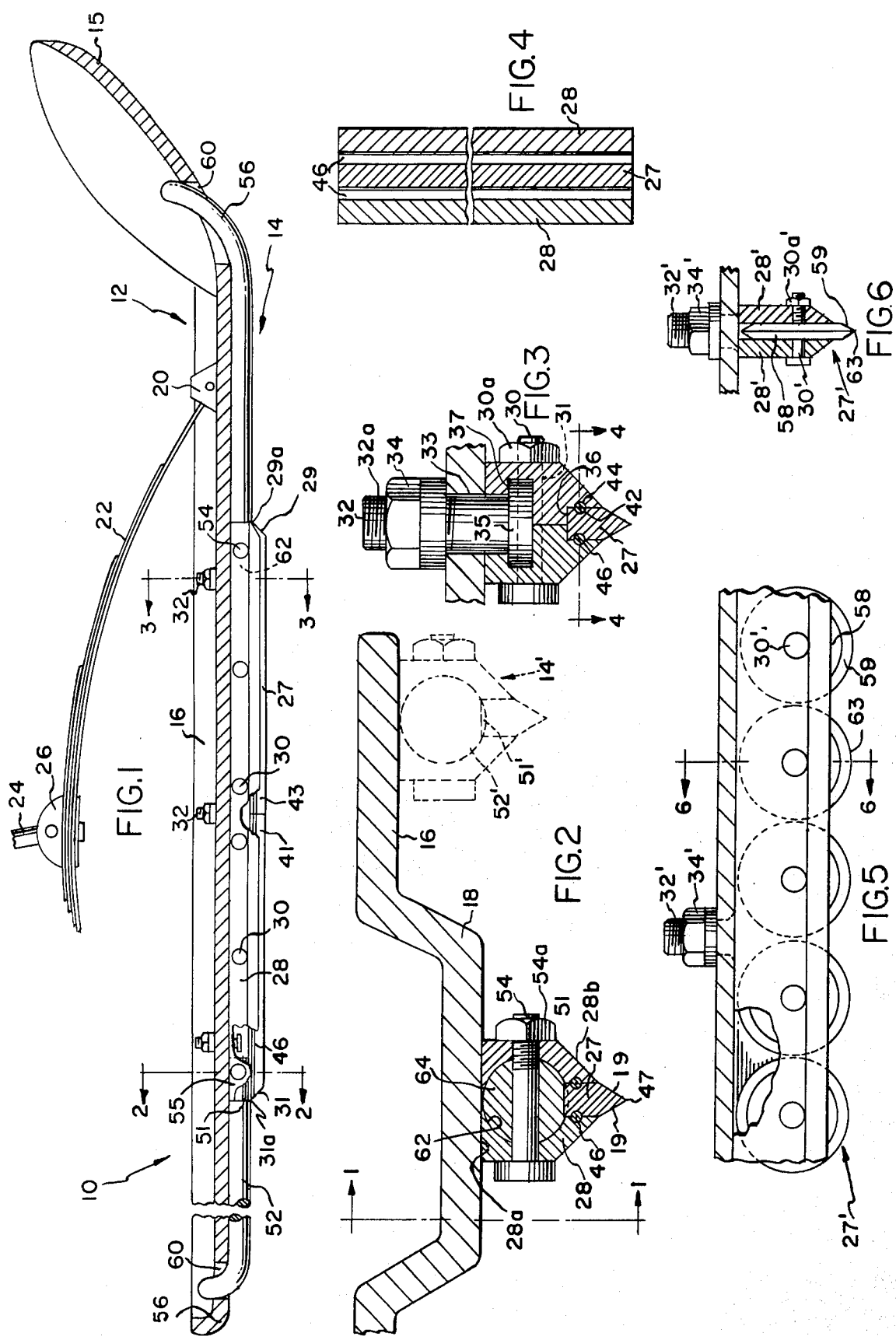

SNOWMOBILE SKI

This is a continuation of application Ser. No. 253,863, filed in the United States Patent Office on May 16, 1972 now U.S. Pat. No. 3,778,078.

THE FIELD OF THE INVENTION

This invention relates to snowmobile skis, and more particularly to a keel having a hardened wear rail removably clamped to the underside of a snowmobile ski runner.

BACKGROUND OF THE INVENTION

The steering of snowmobiles is conventionally accomplished by a pair of ground engageable skis which are mounted on the front of the snowmobile and are turned in the direction in which the snowmobile is to be propelled. The turning radius of a snowmobile which is equipped with conventional skis, traversing very hard snow or ice is very large because the conventional ski runners merely slide along the surface without "digging in". To overcome this, snowmobile skis are provided with skags or keels on the underside thereof, having sharpened carbide wear rails which cut or bite into the hardened surface to positively control the turning of the snowmobile. The ability to positively control the path of movement of the snowmobile becomes particularly important in racing at high speeds.

When a carbide wear rail becomes worn, it is important that the skag assembly be so constructed that only the worn wear rail need be discarded and a substitute wear rail installed in its place. Accordingly, it is an object of the present invention to provide a snowmobile ski having a hardened wear rail removably clamped to the underside thereof to permit the hardened wear rail to be replaced by a substitute rail.

The wear rail, which is conventionally formed of carbide and is generally much harder and more brittle than the mounting member for the carbide rail, will crack or break upon sharp impacts. It has been found that if the upper leading edge of the hardened wear bar is protected, the incidence of breakage is reduced. Accordingly, it is an object of the present invention to provide a snowmobile ski runner having a hardened wear rail on the underside thereof and a guard which will protect the leading edge of the wear rail. Although it is important that the hardened wear rail be releasably clamped to the underside of the ski runner to permit its quick removal, it is imperative that the wear rail cannot be inadvertently dislodged from a ski runner mounted on a racing-type snowmobile. If the wear rail on a racing snowmobile is dislodged, the delay in halting the snowmobile and installing new wear rails can cause a snowmobile racer the loss of the race.

The skis on racing snowmobiles are subjected to particularly large stresses and repeated jarring which tends to dislodge the wear rail. The inadvertent loss of a wear rail when traveling at high speeds represents a safety hazard. If a racer attempts a sharp turn at high speeds without a wear rail, he will lose his steering capability which could cause him to leave the track and possibly hit other racers. Accordingly, it is another object of the present invention to removably couple a hardened rail to the underside of a snowmobile ski and positively preclude the wear rail from being jarred loose from the underside of a snowmobile ski.

It is yet another object of the present invention to provide a snowmobile ski rail having a hardened wear rail positively coupled thereto by elongate key members.

It has been found that the handling characteristics of some snowmobiles improve as the wear rails are moved to different locations along the underside of the ski. On some occasions, the machine will handle better if the wear rail comprises longitudinally spaced sections separated by a gap underlying the king pin. Accordingly, it is still a further object of the present invention to provide a keel for a snowmobile ski runner having interchangeable parts which permits a hardened wear rail mounted thereon to be positioned substantially anywhere along the underside of the ski runner.

Yet another object of the present invention is to provide a keel for a snowmobile ski having a pair of clamp members removably coupled to a hardened wear rail and adapted to be removably coupled to the underside of the ski runner.

Other objects and advantages of the present invention will become apparent as the description thereof proceeds.

SUMMARY OF THE INVENTION

A keel adapted to be mounted on the underside of a longitudinal, snowmobile ski runner comprising: a wear rail for engaging the surface to be traversed; a pair of opposed, separable, clamp members for removably clamping opposite sides of the wear rail; means for removably mounting the clamp members on the underside of the runner; and key means reacting between the wear rail and the clamp members for releasably preventing relative vertical movement of the clamp members and the wear rail.

The present invention may more readily be understood by reference to the accompanying drawings, in which:

FIG. 1 is a sectional side view, taken on the line 1—1 of FIG. 2, of a snowmobile ski constructed according to the present invention;

FIG. 2 is an enlarged sectional end view, taken on the line 2—2 of FIG. 1;

FIG. 3 is an enlarged sectional end view, taken on the line 3—3 of FIG. 1;

FIG. 4 is an enlarged sectional plan view, taken on the line 4—4 of FIG. 3;

FIG. 5 is a sectional side view, similar to FIG. 1, of a slightly modified construction; and FIG. 6 is a sectional end view taken along the line 6—6 of FIG. 5.

DESCRIPTION OF THE PREFERRED EMBODIMENTS

A snowmobile ski constructed according to the embodiment shown in FIGS. 1 – 4 is generally designated 10 and includes a longitudinal ski runner, generally designated 12, and a skag or keel, generally designated 14, removably mounted on the underside thereof. The longitudinal ski runner 12 includes a longitudinal, flat body portion 16 having a longitudinally recessed, protuberance or rib section 18 and an upturned front end 15, as usual. The skis 10 are particularly adapted for use on a snowmobile (not shown) including a pair of laterally spaced, depending king pins 24 each supported on a ski 10 by a leaf spring assembly 22 connected to the king pin 24 by a spring mount 26 and supported by a pair of longitudinally spaced shackles 20 fixed to the upper side of a ski 10. The longitudinally recessed rib section 18 will be embedded in the snow when the snowmobile is traversing relatively soft snow to control the direction of travel of the snowmobile.

To assist in controlling the direction of travel when the machine is traversing ice or relatively hard snow, the skag or keel 14 is provided and includes a pair of identical clamp members 28 removably coupled to opposite sides of a wear rail 27 by a plurality of bolts 30, received in aligned apertures 31 provided in the clamp members 28, and nuts 30a removably threaded thereon. The clamp members 28 are removably coupled to the underside of the rib 18 by a plurality of T-bolts 32 having enlarged heads 35 received in semicylindrical confronting cutouts 37 provided on the inner surfaces of the clamp members 28. The T-bolts 32 include threaded shanks 32a received in a plurality of longitudinally spaced apertures 33 provided in the rib 18 and secured thereto by a plurality of nuts 34. The top surfaces 28a of the clamp members 28 are flat to provide increased bearing surfaces which minimize roll of the skag 12 about its longitudinal axis and eliminate the need for a reinforcing "fish plate" between the underside of the ski runner 16 and the top of the clamp members 28.

The clamp members 28 each include a longitudinal notch 36 along the lower inside surface thereof in confronting relation with the cutout or notch 36 of the other clamp member 28 to define a downwardly opening, longitudinally extending slot receiving the longitudinally extending, wear rail blank 27 which may conveniently be formed of hardened material such as carbide. A pair of semi-cylindrical, longitudinal recesses 42 are formed in opposite sides of the wear rail blank 27 in confronting relation with a pair of semi cylindrical, longitudinal recesses 44 formed in the inside vertical faces of the notches 36 to define longitudinal keyways for receiving a pair of longitudinal, cylindrical keys 46 which positively prevent the carbide blank 27 from being dislodged from the clamp members 28 when the clamps are in the clamping positions illustrated in FIGS. 2 and 3. The lower portions of the clamps 28 converge downwardly as illustrated at 28b. The keyway recesses 44 are cold rolled in the clamp members 28 by a pair of opposing, rotatable roller pressing members (not shown) between which the clamp members are individually passed. One of the roller members includes an annular forming rib which forms the groove or keyway portion as the clamp members are passed between the rollers.

The clamps 28 may be conveniently constructed of steel having a hardness rating of 22–25 on the Rockwell RC hardness scale, but the rail 27 comprises carbide which is substantially harder than steel and has a hardness rating of 88.2 – 92.4 on the Rockwell RC hardness scale. The carbide rail 27 is very thin, i.e. 3/32 inches wide, very brittle, and subject to breakage on sharp impact. To minimize breakage of the rail 27, the leading and trailing edges are beveled, as indicated by the reference characters 29 and 31, at an angle of 30° to 45° to the horizontal to enable the rail to glide over obstructions without absorbing their full impact as the snowmobile is traveling.

The leading and trailing ends 55 of the clamp members 28 include confronting, semi-cylindrical recesses 62 for receiving the ends 64 of a pair of coupling rods 52 removably coupled thereto by bolts 54 and nuts 54a. The free ends 56 of the coupling rods 52 are received in longitudinally, spaced, front and rear apertures 60 provided in the underside of the ski runner 12. The uppermost portions 29a and 31a of the leading and trailing edges 29 and 31, respectively, are protected from hitting obstructions in the path of the rail by the lower portions 51 of the coupling rods 52. The lower portions 51 of the coupling rods 52 also define thrust shoulders preventing longitudinal movement of the wear rail 27 relative to the clamp members 28. The lower portion of the carbide blank converges downwardly to a relatively sharp edge 47 to form an included angle between the side faces of the blank, of 60° to 120°.

As illustrated in the drawing, the wear rail 27 comprises a pair of identical sections 41 and 43 which can be selectively interchanged with each other. The leading end 29 of the leading rail 41 will tend to wear quicker than the trailing end 31 on the trailing rail 43. The positions of the rail sections 41 and 43 can be interchanged after the front rail becomes partially worn so that the two rails will have approximately the same useful life. The positions of the wear rail sections 41 and 43 can be interchanged by merely turning the entire skag or keel 12 end for end or uncoupling the clamp members 28 from the coupling rods 52 and turning the wear bar supporting clamp members 28 end for end. The wear rail sections 41 and 43 can also be unclamped by loosening bolts 30 and nuts 31 and interchanged.

The concept of coupling and decoupling the coupling rods 52 to the clamp members 28 is particularly important to enable differing length wear rails 27 and clamp members 28 to be coupled to the underside of the ski 12. For instance, a wear rail 27 of substantially shorter length than that shown in FIG. 1 could be utilized by merely utilizing coupling rods 52 of a length longer than the length of the rods shown in FIG. 1. On the other hand, the clamp members 28 and the wear rail blank 27 illustrated in the drawing could be replaced by pairs of longitudinally spaced clamps gripping longitudinally spaced rail rods and a coupling rod (not shown) would span the pairs of clamp members. Accordingly, any number of different combinations of different length and number of coupling rods and skags could be utilized depending upon the characteristics of particular snow machine under consideration.

By coupling the clamp members 28 to the ski with the connecting rods 52 in addition to the bolts 32, a much safer and reliable system is provided. In the event that the bolts 32 break, the wear rail 27 will track behind the front connecting rod 52.

When a snowmobile turns, the ski 10 will cant about its longitudinal axis. To assist in turning, it is sometimes desirable to mount a skag or keel 14' (FIG. 2) on the underside of the side portions of the ski runner 16. As the snowmobile negotiates a turn and the ski is canted, the skag 14' will be moved downwardly to engage the ice and snow. Coupling rods 52 need not be utilized with the keel 14' which is connected to the underside of the runner only by the T-bolts 32 and the nuts 34.

The keels 14 constructed according to the present invention may be used on existing snow machines which have conventional ⅜ inch diameter one piece wear rods similar to connecting rods 52 extending along the underside of the ski between recesses 60. The existing one piece wear rod would be replaced by two, relatively shorter coupling rods 52. The use of keel apparatus constructed according to the present invention, as opposed to the conventional wear rods, provides a substantially safer operating snowmobile and this is always important to snowmobile operators.

The snowmobile ski 10 is assembled by connecting the coupling rods 52 to the front and rear ends 55 of the clamp members 28 by bolts 54 and inserting the carbide wear rail blank 27 in the slot defined by the longitudinally extending notches 36 at the bottom of the clamp members 28 and inserting the T-bolts 32 received in the confronting notches 36 at the top of the adjacent clamp members 28.

The longitudinally extending keys 46 are then inserted in the keyways defined by the longitudinal, confronting keyway portions 42 and 44. The nuts 30a are tightened on the bolts 30 to positively clamp the keys in position to prevent the wear rail blank 27 from moving vertically. The clamp members 28 and coupling rods 52 are bowed outwardly and the rod ends 56 are positioned in the apertures 60 in the underside of the ski runner 12. When the clamp members 28 and the connecting rods 52 are permitted to return to their original unbowed condition, the rod ends are received in the apertures 60 and the T-bolts 32 are received in the apertures provided in the underside of the ski runner 16. The rail 27 is prevented from moving longitudinally by abutting the lower portions 51 on the connecting rods 52.

When the leading edge 29 of the wear rail 27 becomes worn with use, the skag 10 is removed from the underside of the runner 16 and turned end for end so that the formerly trailing edge 31 is now the leading edge and the former leading edge 29 is now the trailing edge. In the event that one of the carbide sections 41 or 43 breaks, only the broken section need be removed and replaced with an identical section. The unbroken portion of the broken section can be salvaged for future use with other wear rail sections 41 and 43. The concept of reusing the salvaged material represents a substantial savings of the relatively expensive carbide material.

The skags 14' are installed with stub shaft portions 52' being substituted for the coupling rods 52. The stub shaft portions do not extend into the apertures 60 but include lower shoulder-defining portions 51' in prolongation with the upper leading and trailing edge portions 29a and 31a providing protection for the upper portions 29a and 31a of the leading and trailing wear rail edges.

It should be noted that the underside of the wear rail could be curvilinear so that the snowmobile is riding on the snow with substantial point contact.

ALTERNATE EMBODIMENT

Referring now more particularly to FIGS. 5 and 6, an alternate embodiment is illustrated wherein one clamp member 28' is coupled to an identical clamp member by bolts 30' and nuts 30a'. Parts corresponding to parts of the apparatus illustrated in FIG. 1 are identified by identical numerals followed by a prime designation. One of the clamp members 28' is removably coupled to the underside of the ski runner 12' by means of a bolt 32', fixed to the top of one of the clamps 28', and a nut 34'. A wear rail, generally designated 27', is provided and comprises a plurality of generally flat, cylindrical discs 60 having circumferentially outer sides 61 and 62 converging to a sharp annular edge 63 which engages the surface being traversed. As the undersides of the discs 60 become worn, the disc retaining nuts 30a are loosened from the bolts 30 and the discs 60 can be individually rotated to expose the unworn portions to the surface being traversed.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. A keel for longitudinally extending ski runner including:
   wear rail means for engaging a surface to be traversed;
   longitudinally extending wear rail mount means having an upper face for bearing against the underside of said ski runner and a lower face having a longitudinally extending groove therein;
   means for fastening said mount means to the underside of said runner; said wear rail means comprising a plurality of longitudinally spaced, flat discs having upper portions received in said groove and lower portions extending below said mount means, said discs being mounted for rotation on said mount means to permit selected perimetrically spaced portions of said discs to engage the surface to be traversed.

2. The keel set forth in claim 1 wherein the sides of said discs radially outwardly converge to a perimetrically extending edge engageable with the surface to be traversed.

3. The keel as set forth in claim 1 wherein said mount means includes a pair of opposed, longitudinally extending, transversely separable, clamp members for clamping to opposite sides of said discs to hold said discs in selected rotary positions.

4. A runner blade for a longitudinally extending snowmobile ski runner comprising:
   a longitudinally extending wear rail for engaging a surface to be traversed including a lower portion having opposed side surface which converge downwardly to define a sharp ground engaging lower edge portion and an upper portion of increased breadth;
   opposed, longitudinally extending, transversely separable clamp members adapted to underlie said runner, for clamping opposite sides of said upper portion;
   means extending upwardly from at least one of said clamp members for removably mounting said clamp members on the underside of said ski runner;
   said clamp members including longitudinally extending, confronting groove portions along the lower portions thereof cooperating to define a downwardly opening, groove receiving said upper wear rail portion; and
   means reacting between said clamp members for removably clamping said clamp members to opposite sides of said upper wear rail portion;
   said included angle between said opposed side surfaces being in the range of 60° – 65°.

5. A snowmobile ski comprising:
   a longitudinal runner having an upturned leading end, a trailing end, and a plurality of apertures which extend therethrough, between said ends; and a keel mounted on the underside of said runner including:
   longitudinally extending mounting means having a generally flat upper face bearing against the underside of said runner to minimize roll of said keel about its longitudinal axis when said keel is subjected to transverse forces and a bottom face provided with a longitudinally extending groove therein;
   a plurality of longitudinally aligned fastening means extending upwardly from said upper face and received in said apertures for fastening said keel to said runner;
   wear rail means, comprised of material substantially harder than said mounting means and having an upper portion received in said groove and a lower portion disposed below said mounting means, for engaging a surface to be traversed;
   said lower portion including laterally opposite side surfaces converging downwardly to define a sharp, ground engaging cutting edge, the included angle between said converging side surfaces being in the range of 60° – 65°;
   said upper portion including generally vertical side walls joined at their lower edges to the upper edges of said laterally opposite side surfaces.

6. The snowmobile ski as set forth in claim 5 including wear rail stop means supported by the trailing end of said mounting means and disposed rearwardly of and in prolongation with, the upper trailing edge portion of said wear rail means to prevent rearward movement thereof.

7. The snowmobile ski as set forth in claim 5 wherein said groove includes upstanding side walls and further including means reacting between the walls of said groove and said wear rail means to prevent vertical movement of said wear rail means.

8. A keel for a longitudinally extending snowmobile ski runner comprising:
   longitudinally extending mounting means having a flat upper face for bearing against the underside of said ski runner to minimize roll of said keel about its longitudinal axis when said keel is subjected to transverse forces and a lower face provided with a longitudinally extending groove therein;
   longitudinally aligned fastening means extending upwardly from said upper face of said mounting means for fastening said mounting means to said ski runner; and
   wear rail means comprised of material substantially harder than said mounting means for engaging a surface to be traversed having an upper portion received in said groove and a lower portion disposed below said mounting means;
   said lower portion including side surfaces converging downwardly to form a sharp ground engaging cutting edge, the included angle between said converging side surfaces being in the range of 60° – 65°;
   said upper portion having generally vertical sidewall surfaces joined at their lower edges to the upper edges of said side surfaces.

9. The keel as set forth in claim 8 including means reacting between said mounting means and said wear rail means for inhibiting relative vertical movement of said piece of carbide and said mounting means.

10. The keel as set forth in claim 8 wherein the width of said wear rail means is substantially less than the length thereof.

11. The keel as set forth in claim 8 wherein said included angle is 60°.

12. The keel as set forth in claim 8 wherein the breadth of said upper portion of said wear rail means is at least equal to the breadth of said lower portion of said mounting means includes opposed, longitudinally extending, transversely separable, clamp members for clamping to opposite sides of said upper portion, said clamp members including longitudinally extending groove portions cooperating to define a downwardly opening groove receiving said upper portion.

13. The keel as set forth in claim 8 wherein said wear rail means comprises at least one piece of carbide having a hardness rating in the range of 88.2 to 92.4 on the Rockwell RC hardness scale.

14. The keel as set forth in claim 13 wherein said piece of carbide includes at least said leading edge being upwardly leading and trailing edges, at least said leading edge being vertically inclined at an angle of 30° – 45° to the horizontal for guiding the keel over obstructions.

15. The keel as set forth in claim 14 wherein said piece of carbide has a width substantially equal to 3/32 inch.

* * * * *